United States Patent
Yeon et al.

(10) Patent No.: US 12,087,509 B2
(45) Date of Patent: Sep. 10, 2024

(54) MULTILAYER CERAMIC CAPACITOR

(71) Applicant: SAMSUNG ELECTRO-MECHANICS CO., LTD., Suwon-si (KR)

(72) Inventors: Gyu Ho Yeon, Suwon-si (KR); Won Kuen Oh, Suwon-si (KR); Seo Won Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 217 days.

(21) Appl. No.: 17/725,246

(22) Filed: Apr. 20, 2022

(65) Prior Publication Data

US 2023/0197343 A1 Jun. 22, 2023

(30) Foreign Application Priority Data

Dec. 17, 2021 (KR) .................. 10-2021-0181764

(51) Int. Cl.
*H01G 4/06* (2006.01)
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ................. H01G 4/2325; H01G 4/30

USPC ............................... 361/211, 321.1
See application file for complete search history.

(56) References Cited

U.S. PATENT DOCUMENTS

| 2001/0043454 | A1 | 11/2001 | Yoshii et al. | |
| 2017/0018363 | A1* | 1/2017 | Tanaka | H01G 4/30 |
| 2017/0301468 | A1* | 10/2017 | Kim | H01G 4/30 |
| 2020/0105450 | A1* | 4/2020 | Arai | H01Q 7/06 |
| 2021/0082621 | A1* | 3/2021 | Kim | H01G 4/12 |

FOREIGN PATENT DOCUMENTS

JP 2001-307947 A 11/2001

* cited by examiner

*Primary Examiner* — Jared Fureman
*Assistant Examiner* — Lucy M Thomas
(74) *Attorney, Agent, or Firm* — MORGAN, LEWIS & BOCKIUS LLP

(57) ABSTRACT

A multilayer ceramic capacitor includes a body including a dielectric layer and internal electrodes and external electrodes disposed on one surface of the body, wherein the external electrodes respectively include a first electrode layer connected to the internal electrodes and including copper (Cu); a second electrode layer disposed on the first electrode layer and including silver (Ag) and palladium (Pd); and a copper-palladium intermetallic compound formed at an interface between the first electrode layer and the second electrode layer, wherein the second electrode layer includes a first layer and a second layer formed to be sequentially adjacent to the first electrode layer, and the first layer has a content of palladium higher than a content of palladium of the second layer.

13 Claims, 5 Drawing Sheets

MULTILAYER CERAMIC CAPACITOR

CROSS-REFERENCE TO RELATED APPLICATION(S)

This application claims benefit of priority to Korean Patent Application No. 10-2021-0181764 filed on Dec. 17, 2021 in the Korean Intellectual Property Office, the disclosure of which is incorporated herein by reference in its entirety.

TECHNICAL FIELD

The present disclosure relates to a multilayer ceramic capacitor.

BACKGROUND

Multilayer ceramic capacitors (MLCCs), having advantages such as compactness, guaranteed high capacitance, are important components used in industries such as communications, computers, home appliances, and automobiles and, in particular, key passive elements used in various electric, electronic, and information communications equipment such as cellular phones, computers, digital TVs, and the like.

In the related art, in order to mount a multilayer ceramic capacitor on a substrate or the like, external electrodes of the multilayer ceramic capacitor include a plating layer formed on an electrode layer. However, due to bending of the substrate and oxidation of tin (Sn) included in the plating layer during mounting, due to a high-temperature environment, solder cracks may occur or contact resistance may increase.

To solve this problem, a secondary external electrode structure including an electrode containing copper (Cu) and an electrode containing silver (Ag) and palladium (Pd) is used. In the case of using such an external electrode, a multilayer ceramic capacitor having excellent reliability in a high temperature and high vibration environment may be provided using Ag epoxy as a conductive glue, instead of tin soldering.

However, in the case of the secondary external electrode structure, a peel-off phenomenon in which the electrodes are separated or peeled off may occur, and thus, a multilayer ceramic capacitor having improved inter-electrode adhesion strength is required.

SUMMARY

Exemplary embodiments provide a multilayer ceramic capacitor, which prevents bending of a substrate when mounted, secures stability through low-temperature mounting, and has external electrodes having excellent adhesion strength.

According to an aspect of the present disclosure, a multilayer ceramic capacitor may include: a body including a dielectric layer and internal electrodes and external electrodes disposed on one surface of the body, wherein the external electrodes respectively include a first electrode layer connected to the internal electrodes and including copper (Cu); a second electrode layer disposed on the first electrode layer and including silver (Ag) and palladium (Pd); and a copper-palladium intermetallic compound formed at an interface between the first electrode layer and the second electrode layer, wherein the second electrode layer includes a first layer and a second layer formed to be sequentially adjacent to the first electrode layer, and the first layer has a content of palladium higher than a content of palladium of the second layer.

According to an aspect of the present disclosure, a method of manufacturing a multilayer ceramic capacitor may include: forming a second electrode layer on a first electrode layer disposed on an outer surface of a body of the multilayer ceramic capacitor, the forming of the second electrode layer includes contacting the first electrode layer with a conductive paste including silver (Ag) and palladium (Pd), wherein the first electrode layer includes copper (Cu); and then sintering at 600 to 700° C. for 1 to 2 hours.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
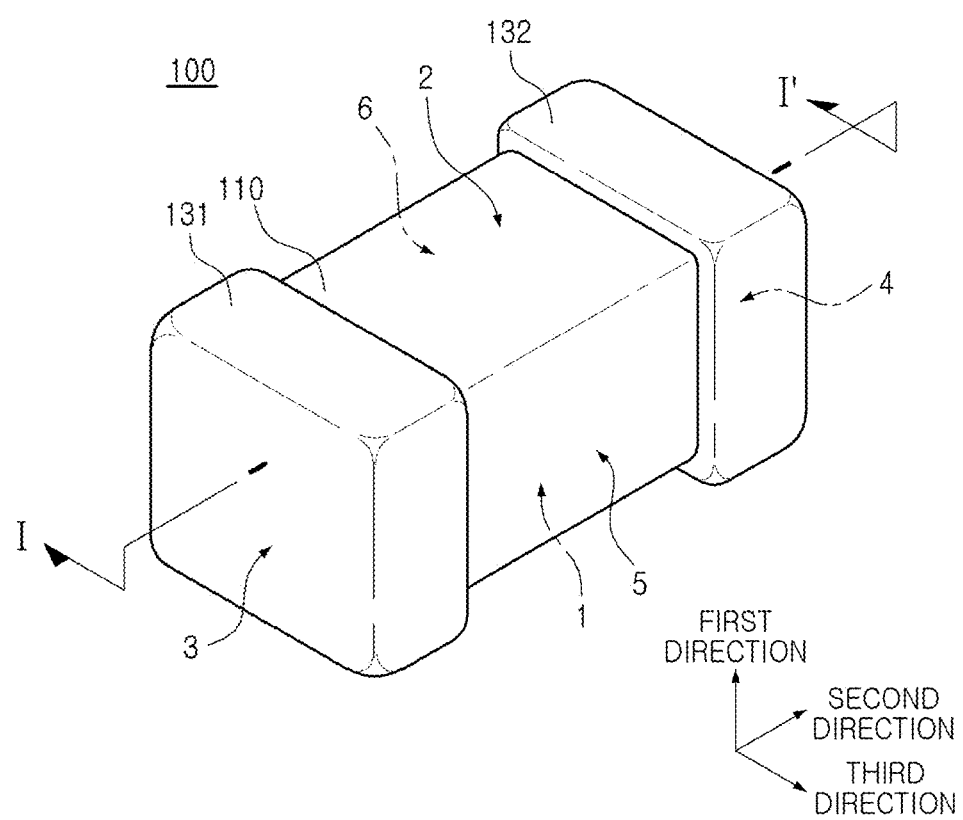
FIG. 1 is a perspective view illustrating a multilayer ceramic capacitor according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present invention, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements.

In the drawings, a first direction may be defined as a stacking direction or a thickness (T) direction, a second direction may be defined as a length (L) direction, and a third direction may be defined as a width (W) direction.

FIG. 1 is a perspective view illustrating a multilayer ceramic capacitor according to an exemplary embodiment in the present disclosure.

Figure 2:
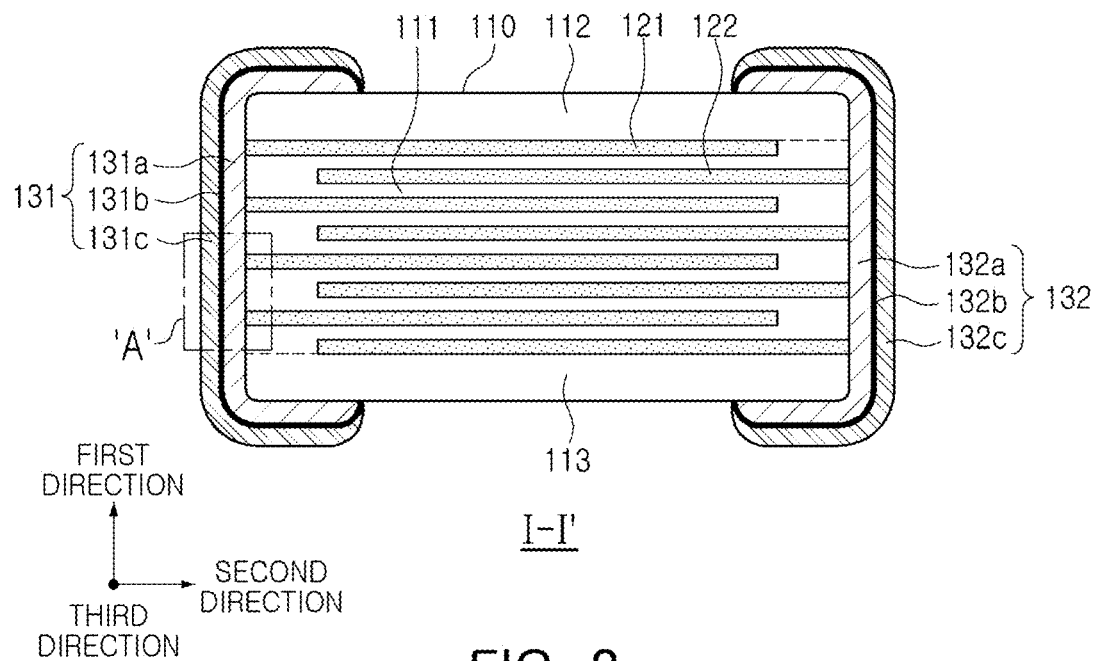
FIG. 2 is a cross-sectional view taken along line I-I' of FIG. 1.

FIG. 2 is a cross-sectional view taken along line I-I' of FIG. 1.

Figure 3:
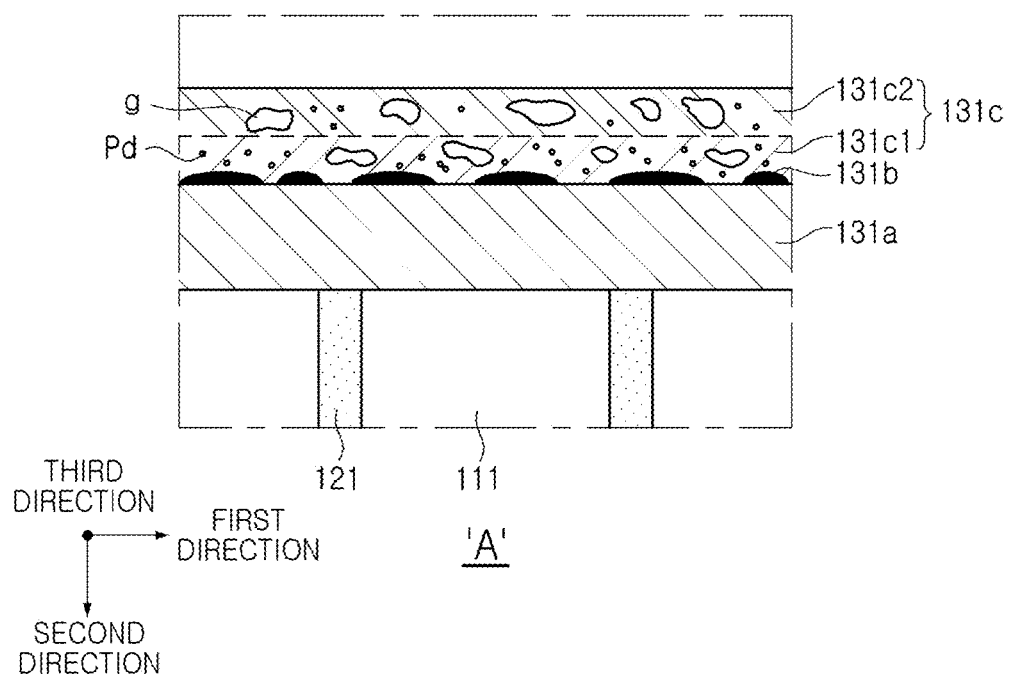
FIG. 3 is an enlarged view of a region A of FIG. 1.

FIG. 3 is an enlarged view of a region A of FIG. 1.

Figure 4:
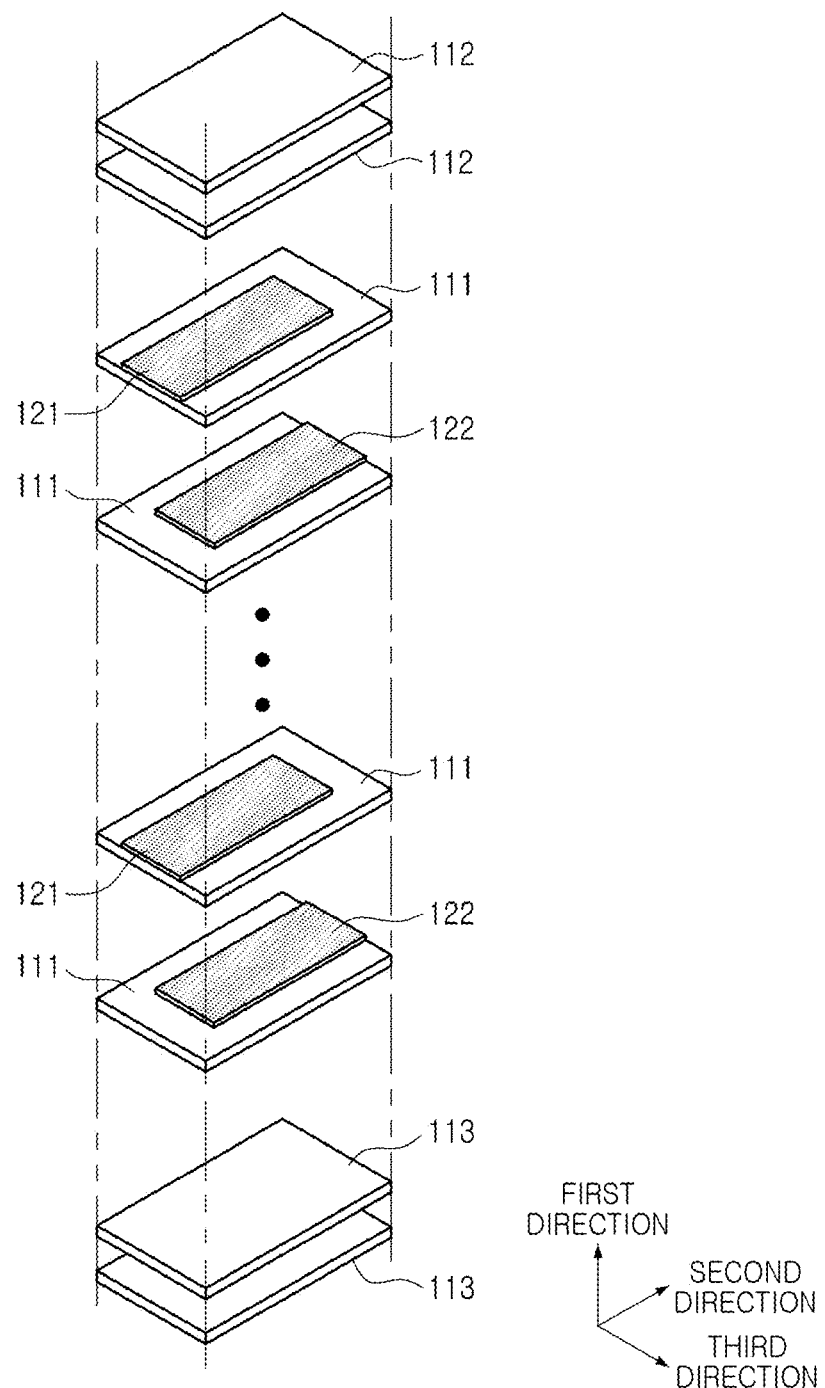
FIG. 4 is an exploded perspective view schematically illustrating a body in which a dielectric layer and internal electrodes are stacked according to an exemplary embodiment in the present disclosure.

FIG. 4 is an exploded perspective view schematically illustrating a body in which a dielectric layer and internal electrodes are stacked according to an exemplary embodiment in the present disclosure.

Hereinafter, a multilayer ceramic capacitor according to an exemplary embodiment in the present disclosure will be described in detail with reference to FIGS. 1 to 4.

A multilayer ceramic capacitor 100 according to an exemplary embodiment in the present disclosure includes a body 110 including a dielectric layer 111 and internal electrodes 121 and 122 and external electrodes 131 and 132 disposed on one surface of the body, wherein the external electrodes include first electrode layers 131a and 132a connected to the internal electrodes and including copper (Cu), second electrode layers 131c and 132c disposed on the first electrode layer and including silver (Ag) and palladium (Pd), and copper-palladium intermetallic compounds 131b and 132b formed at an interface between the first electrode layer and the second electrode layer, wherein the second electrode layers 131c and 132c include first layers 131c1 and 132c1 and second layers 131c2 and 132c2 formed to be sequentially adjacent to the first electrode layers 131a and 132a, and the first layers 131c1 and 132c1 have a content of palladium higher than a content of palladium of the second layers 131c2 and 132c2.

There is no particular limitation to a specific shape of the body 110 but, as illustrated, the body 110 may have a hexahedral shape or a shape similar thereto. Due to shrinkage of ceramic powder particles included in the body 110 or polishing of corner portions during a sintering process, the body 110 may have substantially a hexahedral shape, not a hexahedral shape with perfectly straight lines.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

A material for forming the dielectric layer 111 is not limited as long as sufficient electrostatic capacity may be obtained. For example, a barium titanate-based material, a lead composite perovskite-based material, or a strontium titanate-based material may be used. The barium titanate-based material may include a $BaTiO_3$-based ceramic powder particles, and an example of the ceramic powder particles may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

Here, a thickness of the dielectric layer 111 may be changed according to capacitance design of the multilayer ceramic capacitor 100, and a thickness of the first layer may be configured to be 0.1 to 10 µm after sintering in consideration of the size and capacitance of the body 110, and may be 0.4 µm or less for miniaturization and high capacitance of the multilayer ceramic capacitor 100, but the present disclosure is not limited thereto. Here, the thickness of the dielectric layer 111 may refer to an average thickness of the dielectric layer 111 disposed between the internal electrodes 121 and 122. That is, it may refer to an average value of the thickness of the dielectric layer 111 measured at a plurality of points. The thickness of the dielectric layer 111 may be measured by scanning cross-sections of the body 110 in the first direction and the second direction with a scanning electron microscope.

The body 110 may include the capacitance forming portion including the first internal electrode 121 and the second internal electrode 122 disposed to face each other with the dielectric layer 111 interposed therebetween and forming capacitance and cover portions 112 and 113 formed on upper and lower surface of the capacitance forming portion.

The upper cover portion 112 and the lower cover portion 113 may be formed by stacking a single dielectric layer or two or more dielectric layers on upper and lower surfaces of the capacitance forming portion Ac in the first direction or thickness direction, respectively, and may serve to prevent damage to the internal electrodes due to physical or chemical stress.

The upper and lower cover portions 112 and 113 may have the same material and configuration as those of the dielectric layer 111 of the capacitor forming portion except that the upper and lower cover portions 112 and 113 do not include internal electrodes. The upper and lower cover portions 112 and 113 may each have a thickness of 25 µm or less, but the present disclosure is not limited thereto.

The internal electrodes 121 and 122 may be alternately disposed with the dielectric layer 111, and the first internal electrode 121 and the second internal electrode 122 may be disposed to face each other with the dielectric layer 111 interposed therebetween.

That is, the first and second internal electrodes 121 and 122 are a pair of electrodes having different polarities, may be alternately exposed to the third and fourth surfaces 3 and 4 of the body 110 in the stacking direction of the dielectric layer 111 with the dielectric layer 111 therebetween, and may be electrically insulated from each other by the dielectric layer 111 disposed therebetween. Accordingly, the first internal electrode 121 may be connected to the first external electrode 131 on the third surface of the body 110, and the second internal electrode 122 may be connected to the second external electrode 132 on the fourth surface of the body 110.

The thicknesses of the first and second internal electrodes 121 and 122 may be determined according to purposes, and may be within a range of 0.2 to 1.0 µm in consideration of a size and capacitance of the ceramic body 110 and may be 0.4 µm or less for miniaturization and high capacitance of the multilayer ceramic capacitor 100, but the present disclosure is not limited thereto. Here, the thickness of the internal electrodes 121 and 122 may refer to an average thickness of the internal electrodes 121 and 122. That is, the thickness may refer to an average value of the thicknesses of the internal electrodes 121 and 122 measured at a plurality of points. The thickness of the internal electrodes 121 and 122 may be measured by scanning cross-sections of the body 110 in the first direction and the second direction with a scanning electron microscope.

A conductive metal included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The first and second external electrodes 131 and 132 may include first electrode layers 131a and 132a, second electrode layers 131c and 132c, and copper-palladium intermetallic compounds 131b and 132b formed at the interfaces between the first electrode layers 131a and 132a and the second electrode layers 131c and 132c.

The first electrode layers 131a and 132a may include copper (Cu), and may serve to mechanically couple the body 110 and the external electrodes 131 and 132 to each other. The first electrode layers 131a and 132a are connected to the first and second internal electrodes 121 and 122 alternately exposed through the third and fourth surfaces 3 and 4 of the body 110 opposing in the second direction, thereby securing electrical conduction between the first and second external electrodes 131 and 132 and the first and second internal electrodes 121 and 122.

The first electrode layers 131a and 132a may be formed by dipping the third and fourth surfaces 3 and 4 of the body 110 in a conductive paste including copper (Cu) and glass and then performing sintering, for example. Accordingly, the external electrodes 131 and 141 may be sintered electrodes including copper (Cu) and glass.

Meanwhile, a thickness of the first electrode layers 131a and 132a may be 1 to 30 μm, but the present disclosure is not limited thereto.

In this case, the first electrode layers 131a and 132a may be disposed to extend from the third and fourth surfaces 3 and 4 of the body 110 to portions of the first and second surfaces 1 and 2 of the body 110, respectively. In addition, the first electrode layers 131a and 132a may be disposed to extend to portions of the fifth and sixth surfaces 5 and 6 of the body 110, respectively.

The second electrode layers 131c and 132c are disposed on the first electrode layers 131a and 132a and may include silver (Ag) and palladium (Pd). Since the second electrode layers 131c and 132c include silver (Ag) and palladium (Pd), the multilayer ceramic capacitor 100 may be mounted on a substrate by applying Ag epoxy, which is a conductive adhesive, on the second electrode layers 131c and 132c. That is, the multilayer ceramic capacitor 100 may be mounted without tin (Sn) solder, thereby preventing warpage of the substrate and enabling low temperature mounting, thereby securing the stability of the multilayer ceramic capacitor 100. In addition, the multilayer ceramic capacitor 100 having excellent reliability in a high temperature and high vibration environment may be provided.

A ratio of silver (Ag) to palladium (Pd) included in the second electrode layers 131c and 132c may be 1:1 to 99:1. When the second electrode layers 131c and 132c include silver (Ag) but not palladium (Pd), ion migration may occur in a high-temperature environment. In this case, as the second electrode layers 131c and 132c includes palladium (Pd) according to the above ratio, an occurrence of ion migration may be prevented. In this case, the second electrode layers 131c and 132c may further include other metals capable of preventing ion migration, for example, platinum (Pt) and/or gold (Au).

The second electrode layers 131c and 132c may further include glass g. Glass g may control a sintering rate of silver (Ag) and palladium (Pd) when forming the second electrode layers 131c and 132c by applying and sintering a conductive paste, and may secure adhesion to the ceramic substrate.

The glass g component may have a composition in which oxides are mixed, and is not particularly limited, but may be one or more selected from the group consisting of silicon oxide, boron oxide, aluminum oxide, transition metal oxide, alkali metal oxide, and alkaline earth metal oxide. The transition metal may be one or more selected from the group consisting of zinc (Zn), titanium (Ti), vanadium (V), manganese (Mn), iron (Fe), and nickel (Ni), the alkali metal may be one or more selected from the group consisting of lithium (Li), sodium (Na), and potassium (K), and the alkaline earth metal may be one or more selected from the group consisting of magnesium (Mg), calcium (Ca), strontium (Sr), and barium (Ba).

The first and second external electrodes 131 and 132 of the multilayer ceramic capacitor 100 according to an exemplary embodiment in the present disclosure may include copper-palladium intermetallic compounds 131b and 132b formed at an interface between the first electrode layers 131a and 132a and the second electrode layers 131c and 132c. Here, the intermetallic compound refers to a compound having a specific crystal structure in which two or more metals are combined in a simple integer ratio.

The copper-palladium intermetallic compounds 131b and 132b may be formed by mutual diffusion and reaction between copper (Cu) of the first electrode layers 131a and 132a and palladium (Pd) of the second electrode layers 131c and 132c during sintering.

The copper-palladium intermetallic compounds 131b and 132b may be formed in various ratios depending on the palladium content and sintering temperature of the second electrode layers 131c and 132c, and may include, for example, at least one of $Cu_3Pd$ and $CuPd$. However, the present disclosure is not limited thereto.

The copper-palladium intermetallic compounds 131b and 132b may have higher strength than a single metal of copper (Cu) or palladium (Pd) due to intermetallic bonding, and when the copper-palladium intermetallic compounds 131b and 132b are formed at the interface between the first electrode layers 131a and 132a and the second electrode layer 131c and 132c, interfacial bonding strength between the first electrode layers 131a and 132a and the second electrode layers 131c and 132c may be improved.

Here, as the content of copper (Cu) and palladium (Pd) distributed at the interface between the first electrode layers 131a and 132a and the second electrode layers 131c and 132c is higher, mutual diffusion between copper and palladium may become more active to sufficiently form the copper-palladium intermetallic compounds 131b and 132b.

In addition, when a region having a high palladium content exists among regions adjacent to the interface between the first electrode layers 131a and 132a and the second electrode layers 131c and 132c, copper (Cu) and palladium (Pd) may preferentially react with each other in the corresponding region to form the copper-palladium intermetallic compounds 131b and 132b. Accordingly, as shown in FIG. 3, the copper-palladium intermetallic compounds 131b and 132b may have a form of a plurality of islands, and the plurality of islands may be formed as a layer.

According to an exemplary embodiment in the present disclosure, the second electrode layers 131c and 132c may include first layers 131c1 and 132c1 and second layers 131c2 and 132c2 sequentially formed adjacent to the first electrode layers 131a and 132a, the first layers 131c1 and 132c1 may have a higher palladium content than that of the second layers 131c2 and 132c2.

That is, in the second electrode layers 131c and 132c, the palladium content of the first layers 131c1 and 132c1 adjacent to the interface with the first electrode layers 131a and 132a may be higher than the palladium content of the second layers 131c2 and 132c2 not adjacent to the first electrode layers 131a and 132a.

Accordingly, the copper-palladium intermetallic compounds 131b and 132b may be sufficiently formed at the interface between the first electrode layers 131a and 132a and the second electrode layers 131c and 132c by mutual diffusion with copper (Cu) included in the first electrode layers 131a and 132a.

If the palladium content of the second layers 131c2 and 132c2 is higher than the palladium content of the first layers 131c1 and 132c1, the copper-palladium intermetallic compounds 131b and 132b may not be sufficiently formed at the interface between the first electrode layers 131a and 132a and the second electrode layers 131c and 132c, and as a result, the interfacial bonding strength between the first electrode layers 131a and 132a and the second electrode layers 131c and 132c may be reduced.

The first layers 131c1 and 132c1 and the second layers 131c2 and 132c2 may each have a half thickness of the second electrode layers 131c and 132c, but the present disclosure is not limited thereto. As will be described later, the thickness of the first layers 131c1 and 132c1 and the second layers 131c2 and 132c2 may be appropriately adjusted during a process of forming the first layers 131c1 and 132c1 and the second layers 131c2 and 132c2 by applying and sintering a conductive paste having different contents of palladium (Pd). Here, the thickness of the first layers 131c1 and 132c1 and the second layers 131c2 and 132c2 may refer to an average thickness of the first layers 131c1 and 132c1 and the second layers 131c2 and 132c2. That is, the thickness of the first layers 131c1 and 132c1 and the second layers 131c2 and 132c2 may refer to an average value of thicknesses of the first layers 131c1 and 132c1 and the second layers 131c2 and 132c2 measured at a plurality of points. The thickness of the first layers 131c1 and 132c1 and the second layers 131c2 and 132c2 may be measured in cross-sections of the multilayer ceramic capacitor 100 in the first and second directions or cross-sections thereof in the second and third directions through an SEM and a transmission electron microscope (EDS).

According to an exemplary embodiment in the present disclosure, the interface of the first layers 131c1 and 132c1 with the first electrode layers 131a and 132a may have a higher palladium (Pd) content than that of the interface thereof with the second layers 131c2 and 132c2. Palladium (Pd) included in the first layers 131c1 and 132c1 may diffuse toward the first electrode layers 131a and 132a during the sintering process. Accordingly, the interface of the first layers 131c1 and 132c1 with the first electrode layers 131a and 132a may have a higher palladium content than that of the interface thereof with the second layers 131c2 and 132c2. Accordingly, copper-palladium intermetallic compounds 131b and 132b may be sufficiently formed at the interface between the first layers 131c1 and 132c1 and the first electrode layers 131a and 132a.

In addition, since palladium included in the first layers 131c1 and 132c1 diffuses toward the first electrode layers 131a and 132a during the sintering process, the palladium content may decrease in a direction from the interface of the first layers 131c1 and 132c1 with the first electrode layers 131a and 132a toward the interface thereof with the second layers 131c2 and 132c2. As will be described later, the palladium content at the interface of the first layers 131c1 and 132c1 with the first electrode layers 131a and 132a and at the interface thereof with the second layers 131c2 and 132c2 may be measured by mapping the palladium (Pd) element through an SEM-EDS analysis.

In the multilayer ceramic capacitor 100 according to an exemplary embodiment in the present disclosure, the palladium content of the first layers 131c1 and 132c1 may be 3 to 10 wt %, based on wt % of atoms determined using SEM-EDS. When this condition is met, copper-palladium intermetallic compounds 131b and 132b due to diffusion of copper (Cu) and palladium (Pd) at the interface between the first electrode layers 131a and 132a and the second electrode layers 131c and 132c may be sufficiently formed to improve interfacial bonding strength.

If the palladium content of the first layers 131c1 and 132c2 is less than 3 wt %, the diffusion of copper (Cu) and palladium (Pd) at the interface between the first electrode layers 131a and 132a and the second electrode layers 131c and 132c may not be sufficient, thereby reducing the interfacial bonding strength. As a result, adhesion strength of the multilayer ceramic capacitor 100 may be reduced and a peel-off phenomenon of the second electrode layers 131c and 132c may occur.

If the palladium content of the first layers 131c1 and 132c2 is greater than 10 wt %, the diffusion of copper and palladium at the interface between the first electrode layers 131a and 132a and the second electrode layers 131c and 132c is excessive, so that stress is excessively concentrated on the first electrode layers 131a and 132a when external stress is applied, thereby causing a defect that the first electrode layers 131a and 132a are destroyed or the entire multilayer ceramic capacitor 100 is destroyed.

The palladium content of the second layers 131c2 and 132c2 having a lower palladium content than that of the first layers 131c1 and 132c1 may be less than 3 wt %. A lower limit of the palladium content of the second layers 131c2 and 132c2 is not particularly limited, and may be, for example, greater than zero.

As will be described later, the palladium content of the first layers 131c1 and 132c1 and the second layers 131c2 and 132c2 may be measured by mapping the palladium (Pd) element in a cross-section of the plurality of second electrode layers 131c and 132c through an SEM-EDS analysis.

Hereinafter, a method for manufacturing a multilayer ceramic capacitor according to an exemplary embodiment in the present disclosure will be described in detail, but the present disclosure is not limited thereto, and in the description of the method of manufacturing a multilayer ceramic capacitor according to the present embodiment, descriptions that overlap with the multilayer ceramic capacitor described above will be omitted.

Referring to FIGS. 2 and 4, in the method of manufacturing a multilayer ceramic capacitor according to the present exemplary embodiment, a slurry formed to include a powder such as barium titanate ($BaTiO_3$) is applied to a carrier film and dried to form a plurality of multilayer ceramic capacitors. The ceramic green sheet is formed by preparing a slurry by mixing ceramic powder particles, a binder, and a solvent and forming the slurry as a sheet type having a thickness of several μm by a doctor blade method or the like. Next, a conductive paste for internal electrodes including a conductive metal such as nickel powder or the like is applied to the green sheet by a screen-printing method or the like to print an internal electrode pattern.

Thereafter, a plurality of ceramic green sheets on which the internal electrode pattern is printed are stacked to prepare a stack. In this case, the cover portions 112 and 113 may be formed by stacking a plurality of ceramic green sheets on which the internal electrode pattern is not printed on the upper and lower surfaces of the stack.

Thereafter, the body 110 including the dielectric layer 111 and the first and second internal electrodes 121 and 122 is prepared by sintering the stack, and then the first electrode layers 131a and 132a are respectively formed on the third and fourth surfaces of the body such that the first electrode layers 131a and 132a are connected to the first and second internal electrodes 121 and 122.

The first electrode layers 131a and 132a may be formed by applying a conductive paste including copper (Cu), which is a conductive metal, to the third and fourth surfaces 3 and 4 of the body 110 and performing sintering. The first electrode layers 131a and 132a may be formed by a dipping method, but the present disclosure is not limited thereto, and the first electrode layers 131a and 132a may also be formed by transferring a sheet including copper (Cu) and glass.

Next, a conductive paste containing silver (Ag), palladium (Pd), and glass and having a high palladium content may be applied on the first electrode layers 131a and 132a and dried and a conductive paste having a palladium content lower than that of the above conductive paste may be applied and dried sequentially, which may then be sintered to form the second electrode layers 131c and 132c including the first layers 131c1 and 132c1 and the second layers 131c2 and 132c2.

That is, after the conductive pastes having different palladium contents are sequentially applied to the first electrode layers 131a and 132a and then dried, the second electrode layers 131c and 132c including the first layers 131c1 and 132c1 and the second layers 132c1 and 132c2 having different palladium contents may be formed.

Alternatively, after plating or depositing palladium (Pd) on the first electrode layers 131a and 132a, a conductive paste including silver (Ag), palladium (Pd), and glass may be applied, dried, and sintered, thereby forming the second electrode layers 131c and 132c including the first layers 131c1 and 132c1 having a high palladium (Pd) content and the second layers 131c2 and 132c2 having a low palladium (Pd) content.

A mixing ratio of palladium (Pd) and silver (Ag) in the conductive paste may be 1:1 to 1:99, and the content of silver (Ag) and palladium (Pd) in the conductive paste may be 65 to 85 wt %. If the content of silver (Ag) and palladium (Pd) is less than 65%, denseness of the second electrode layers 131c and 132c may be lowered, and if the content of silver (Ag) and palladium (Pd) exceeds 85%, the rheology characteristics may be lowered and shapes of the second electrode layers 131c and 132c cannot be easily controlled.

The conductive paste may further include a binder or an additive as well as the aforementioned silver (Ag), palladium (Pd) and glass, and the second electrode layers 131c and 132c may be formed by applying the conductive paste on the first electrode layers 131a and 132a and performing low temperature sintering at 600 to 700° C. for 1 to 2 hours.

In addition, diffusion of copper (Cu) and palladium (Pd) occurs during the sintering process, and copper-palladium intermetallic compounds 131b and 132b may be formed at the interface between the first electrode layers 131a and 132a and the second electrode layers 131c and 132c.

EXAMPLE

Adhesion strength and a destruction type of sample chips (MLCC) according to the content of palladium (Pd) of the first layers 131c1 and 132c1 and the second layers 131c2 and 132c2 were measured and specified in Table 1 below. Here, each sample had external electrodes 131 and 132 in which the second electrode layers 131c and 132c including Ag and Pd were formed on the first electrode layers 131a and 132a including Cu and was manufactured under the same conditions, except that each sample had different palladium contents in the first layers 131c1 and 132c1.

That is, pastes having different palladium (Pd) contents were applied to each sample and sintered to form the first layers 131c1 and 132c1, and adhesion strength and sample destruction type of a sample in which the Pd content in the first layers 131c1 and 132c1 was less than 3 wt %, a sample in which the Pd content in the first layers 131c1 and 132c1 was 3 to 10 wt %, and the Pd content in the first layers 131c1 and 132c1 exceeded 10 wt % were measured.

Figure 5:
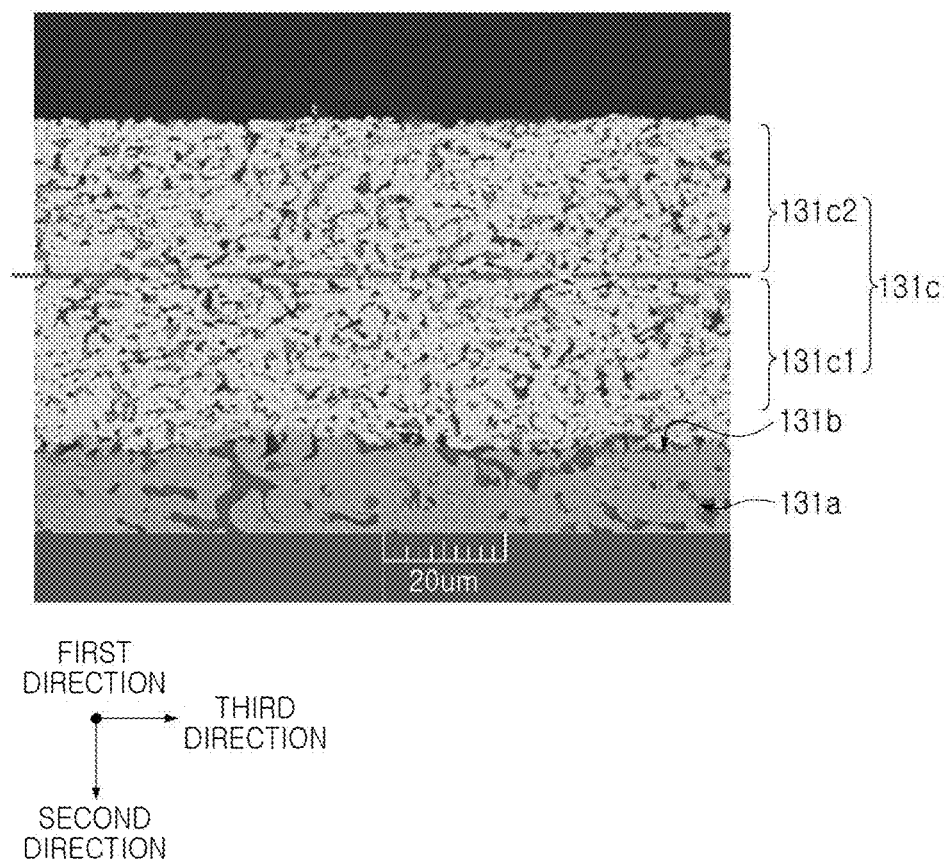
FIG. 5 is an annotated scanning electron microscope (SEM) micrograph of a portion of a cross-section of an external electrode in a second direction and a third direction.

FIG. 5 is an annotated SEM micrograph of a portion of the cross-sections of the external electrodes 131 and 132 in the second and third directions. Specifically, a region of length in the second direction×length in the third direction=110 μm×70 μm based on the center of the external electrodes 131 and 132 in the second direction and third direction after polishing up to a half of the length in the first direction is illustrated. Referring to FIG. 5, a lower region of SEM image represents the first electrode layer 131a, and an upper region represents the second electrode layer 131c. Also, a region adjacent to the first electrode layer 131a represents the first layer 131c1 and a region not adjacent to the second electrode layer 131c2 represents the second layer 131c2 based on the dotted line dividing the second electrode layer 131c in half. In this case, a distribution and content of palladium (Pd) may be measured by mapping the palladium (Pd) element by an SEM-EDS analysis.

Figure 6A:
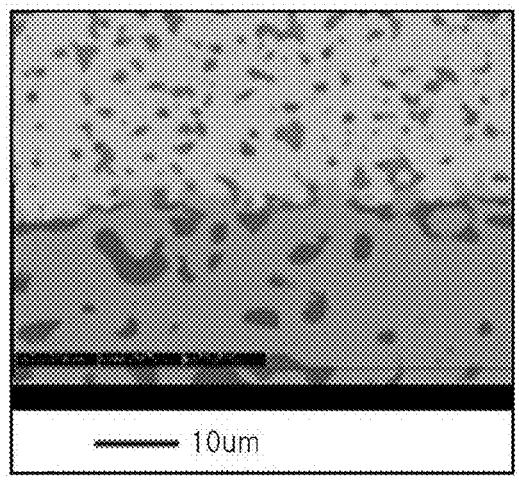
FIG. 6A is a SEM micrograph of a portion of a cross-section of an external electrode in a second direction and a third direction.
Figure 6A:
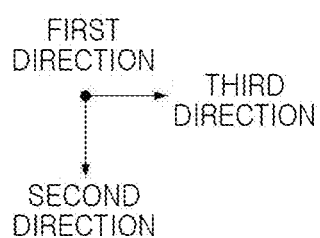
Figure 6B:
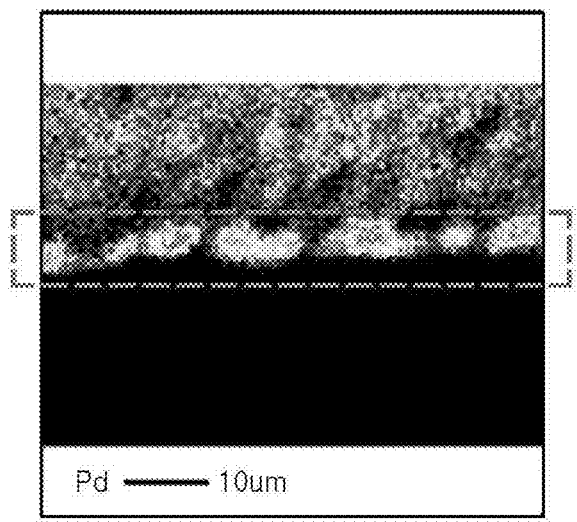
FIG. 6B illustrates the distribution of palladium (Pd) in the portion of the cross-section in FIG. 6A as analyzed by SEM and energy dispersive spectroscopy (EDS).
Figure 6B:
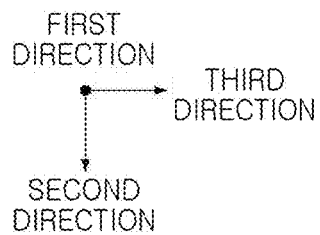

FIG. 6A is a SEM micrograph of a portion of a cross-section of an external electrode in a second direction and a third direction, and FIG. 6B illustrates the distribution of palladium (Pd) in the portion of the cross-section in FIG. 6A as analyzed by SEM and energy dispersive spectroscopy (EDS). Specifically, a region of length in the second direction×length in the third direction=60 μm×40 μm based on the center of the external electrodes 131 and 132 in the second direction and third direction after polishing up to a half of the length in the first direction is illustrated. In each image, lower regions represent first electrode layers 131a and 132a, and upper regions represent second electrode layers 131c and 132c.

In particular, the results analyzed by EDS are 2D mapping analysis results for palladium (Pd) under the conditions of an acceleration voltage of 15 kV and a working distance (WD) of 15 mm. 2D mapping is an analysis method by distinguishing between distributions of each element by color, in which the content of the corresponding element is higher in the order of red region, yellow region, green region, and blue region in the image.

Referring to FIG. 6, it can be seen that the first electrode layers 131a and 132a not containing palladium (Pd) appear black in the EDS analysis. In addition, it can be seen that that the palladium (Pd) content at the interface of the first layers 131c1 and 132c1 with the first electrode layers 131a and 132a is higher than the palladium content at the interface thereof with the second layers 131c2 and 132c2 based on the red region, yellow region, and green region appearing the most (or the presence of the more intense gray regions) at the interface between the first electrode layers 131a and 132a and the second electrode layers 131c and 132c.

Thereafter, the Example, Comparative Example 1, and Comparative Example 2 of 50 sample chips were prepared according to the palladium (Pd) content of the first layers 131c1 and 132c1 and mounted on a substrate using an Ag epoxy as a conductive adhesive, and adhesion strength between the sample chips and the substrate were measured.

Also, a destruction type of the sample chips in Example and Comparative Examples were observed.

TABLE 1

| Sample group | Palladium (Pd) content | Adhesion strength | Destruction type |
|---|---|---|---|
| Comparative Example 1 | Less than 3 wt % | 5~15N | Peel off |
| Example | 3 to 10 wt % | 20~30N | Destruction of adhesive |
| Comparative Example 2 | More than 10 wt % | 20~30N | Destruction of first electrode layer or chip |

Comparative Example 1 is a case in which the palladium content of the first layers 131c1 and 132c1 was less than 3 wt %, and it can be seen that the adhesion strength was lowered to 5 to 15N, and when the adhesion strength test was performed on the sample chip, a peel off phenomenon in which the second electrode layers 131c and 132c were separated from the first electrode layers 131a and 132a occurred.

Comparative Example 2 is a case in which the palladium content of the first layers was greater than 10 wt %, and it can be seen that the adhesion strength was good, but when the adhesion strength test was performed on the sample chip, the first electrode layers 131a and 132a were destroyed or the sample chip itself was destroyed.

Example is a case in which the palladium content of the first layers was 3 to 10 wt %, and the adhesion strength was good. In addition, it can be seen that the Ag epoxy, a conductive adhesive, was destroyed but the sample chip itself was not destroyed when the adhesion strength test was performed.

As set forth above, one of the various effects of the present disclosure is providing a multilayer ceramic capacitor capable of preventing warpage of a substrate when mounted, securing stability through low-temperature mounting, and including external electrodes having excellent adhesion strength.

While example exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
a body including a dielectric layer and internal electrodes and external electrodes disposed on one surface of the body,
wherein the external electrodes respectively include:
a first electrode layer connected to the internal electrodes and including copper (Cu);
a second electrode layer disposed on the first electrode layer and including silver (Ag) and palladium (Pd); and
a copper-palladium intermetallic compound formed at an interface between the first electrode layer and the second electrode layer,
wherein the second electrode layer includes a first layer and a second layer disposed sequentially adjacent to the first electrode layer, and the first layer has a content of palladium higher than a content of palladium of the second layer, and wherein the copper-palladium intermetallic compound is formed directly on the second electrode layer.

2. The multilayer ceramic capacitor of claim 1, wherein the first layer and the second layer has a thickness of half of the second electrode layer.

3. The multilayer ceramic capacitor of claim 1, wherein an interface of the first layer with the first electrode layer has a content of palladium higher than a content of palladium of an interface with the second layer.

4. The multilayer ceramic capacitor of claim 3, wherein the content of palladium decreases in a direction from the interface of the first layer with the first electrode layer to an interface thereof with the second layer.

5. The multilayer ceramic capacitor of claim 1, wherein the content of palladium of the first layer is 3 wt % to 10 wt %.

6. The multilayer ceramic capacitor of claim 1, wherein the content of palladium of the second layer is less than 3 wt %.

7. The multilayer ceramic capacitor of claim 1, wherein the intermetallic compound includes one or more of $Cu_3Pd$ and $CuPd$.

8. The multilayer ceramic capacitor of claim 1, wherein the intermetallic compound is in a form of a plurality of islands.

9. The multilayer ceramic capacitor of claim 8, wherein the plurality of islands are in a form of a layer.

10. The multilayer ceramic capacitor of claim 1, wherein the second electrode layer further includes glass.

11. A method of manufacturing a multilayer ceramic capacitor comprising:
forming a second electrode layer on a first electrode layer disposed on an outer surface of a body of the multilayer ceramic capacitor, the forming of the second electrode layer includes contacting the first electrode layer with a conductive paste including silver (Ag) and palladium (Pd), wherein the first electrode layer includes copper (Cu), and then
sintering at 600 to 700° C. for 1 to 2 hours so that a copper-palladium intermetallic compound is formed at an interface between the first electrode layer and the second electrode layer,
wherein the second electrode layer includes a first layer and a second layer,
wherein the forming of the second electrode layer includes contacting the first electrode layer with a first conductive paste followed by a second conductive paste, and the first and second conductive pastes include silver (Ag) and palladium (Pd),
wherein the first conductive paste has a content of palladium higher than that of the second conductive paste, and
wherein the copper-palladium intermetallic compound is formed directly on the second electrode layer.

12. The method of claim 11, wherein the conductive paste further includes glass frit.

13. The method of claim 12, wherein the conductive paste further includes a binder.

* * * * *